(12) United States Patent
Hazanov et al.

(10) Patent No.: US 8,053,096 B2
(45) Date of Patent: Nov. 8, 2011

(54) NICKEL BASED ALLOY LAYER FOR PERPENDICULAR RECORDING MEDIA

(75) Inventors: Alexander Hazanov, Mountain View, CA (US); Connie Chunling Liu, San Jose, CA (US); Qixu Chen, Milpitas, CA (US); Kueir-Weei Chour, San Jose, CA (US); Xinwei Li, Fremont, CA (US); Shanghsien Alex Rou, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 172 days.

(21) Appl. No.: 12/178,375

(22) Filed: Jul. 23, 2008

(65) Prior Publication Data

US 2010/0021770 A1 Jan. 28, 2010

(51) Int. Cl.
*G11B 5/66* (2006.01)
(52) U.S. Cl. .................. 428/831.2; 428/832.3; 427/131
(58) Field of Classification Search .................. None
See application file for complete search history.

(56) References Cited

U.S. PATENT DOCUMENTS

| | | | |
|---|---|---|---|
| 7,368,185 B2 * | 5/2008 | Hirayama et al. | 428/831.2 |
| 7,632,580 B2 * | 12/2009 | Ikeda et al. | 428/832.3 |
| 2003/0170500 A1 * | 9/2003 | Shimizu et al. | 428/694 TM |
| 2006/0228587 A1 * | 10/2006 | Kuboki | 428/829 |
| 2006/0246323 A1 | 11/2006 | Liu et al. | |

* cited by examiner

*Primary Examiner* — Holly Rickman
(74) *Attorney, Agent, or Firm* — Hollingsworth & Funk, LLC

(57) ABSTRACT

The invention relates to a perpendicular magnetic recording medium having a substrate and a seed layer comprising a Ni alloy.

18 Claims, 6 Drawing Sheets

Cross Section of Disc

Conventional

| COC + Lube |
| Magnetic layers |
| Interlayers (Ru and/or Ru based alloys) |
| Seedlayer |
| SUL, or AFC SUL |
| Substrate |

Figure 2

Media SNR vs Ni$_{100-x}$M$_x$ seed layer thickness (a) Media SNR, and (b) BER vs Ru and Ru based-interlayers' total thickness with $Ni_{100-x}M_x$ as seed layer Normalized scratch depth vs Ni-based alloy SL thickness Scratch depth vs $Ni_{100-x}M_x$ seed layer thickness

NICKEL BASED ALLOY LAYER FOR PERPENDICULAR RECORDING MEDIA

BACKGROUND

Magnetic thin-film media, wherein a fine grained polycrystalline magnetic alloy layer serves as the active recording medium layer, are generally classified as "longitudinal" or "perpendicular," depending on the orientation of the magnetization of the magnetic domains of the grains of the magnetic material. In longitudinal media (also often referred as "conventional" media), the magnetization in the bits is flipped between lying parallel and anti-parallel to the direction in which the head is moving relative to the disc.

Perpendicular magnetic recording media are being developed for higher density recording as compared to longitudinal media. The thin-film perpendicular magnetic recording medium comprises a substrate and a magnetic layer having perpendicular magnetic anisotropy. In perpendicular media, the magnetization of the disc, instead of lying in the disc's plane as it does in longitudinal recording, stands on end perpendicular to the plane of the disc. The bits are then represented as regions of upward or downward directed magnetization (corresponding to the 1's and 0's of the digital data).

FIG. 1 shows a disk recording medium and a cross section of a disc showing the difference between longitudinal and perpendicular magnetic recording. Even though FIG. 1 shows one side of the disk, magnetic recording layers are usually sputter deposited on both sides of the non-magnetic aluminum substrate of FIG. 1. Also, even though FIG. 1 shows an aluminum substrate, other embodiments include a substrate made of glass, glass-ceramic, aluminum/NiP, metal alloys, plastic/polymer material, ceramic, glass-polymer, composite materials or other non-magnetic materials.

While perpendicular media technology provides higher areal density capability over longitudinal media, granular perpendicular magnetic recording media is being developed for further extending the areal density as compared to conventional (non-granular) perpendicular magnetic recording which is limited by the existence of strong lateral exchange coupling between magnetic grains. Granular structure provides better grain isolation through oxide segregation to grain boundary, hence enhancing grain to grain magnetic decoupling and increasing media signal to noise ratio (SNR).

A granular perpendicular magnetic layer contains magnetic columnar grains separated by grain boundaries comprising a dielectric material such as oxides, nitrides or carbides to decouple the magnetic grains. The grain boundaries having a thickness of about 2 Å to about 30 Å, provide a substantial reduction in the magnetic interaction between the magnetic grains. In contrast to conventional perpendicular media, wherein the longitudinal magnetic layer is typically sputtered at low pressures and high temperatures in the presence of an inert gas, such as argon (Ar), deposition of the granular perpendicular magnetic layer is conducted at relatively high pressures and low temperatures and utilizes a reactive sputtering technique wherein oxygen ($O_2$), $C_xH_y$, and/or nitrogen ($N_2$) are introduced in a gas mixture of, for example, Ar and $O_2$, Ar and $C_xH_y$, Ar and $N_2$, or Ar and $O_2$, $C_xH_y$, and $N_2$. Alternatively, oxide, carbide or nitrides may be introduced by utilizing a sputter target comprising oxides, carbides and/or nitrides which is sputtered in the presence of an inert gas (e.g., Ar), or, optionally, may be sputtered in the presence of a sputtering gas comprising $O_2$, $C_xH_y$, and/or $N_2$ with or without the presence of an inert gas. Not wishing to be bound by theory, the introduction of $O_2$, $C_xH_y$, and/or $N_2$ reactive gases, and oxides, carbides, and/or nitrides inside targets provides oxides, carbides, and/or nitrides that migrate into the grain boundaries, thereby providing a granular perpendicular structure having a reduced lateral exchange coupling between grains.

FIG. 2 illustrates a granular perpendicular magnetic recording medium design. Conventional seed layers are used to prepare and enhance crystal growth of the interlayers. Seed layers are normally amorphous (e.g., Ta and Ta alloys) and/or FCC materials (e.g., Cu, Au, and Ag).

The interlayers are normally Ru and Ru alloys which grow hcp <002> orientations to serve as templates for perpendicular growth of magnetic alloys. The interlayers have a total thickness of at least 200 Å.

Under conventional process conditions, the perpendicular media structure is not "rigid" enough to survive the sheer stress caused by hard particles. This results in physical mechanical damage and accompanying irreversible magnetic damage and malfunction. In addition, the high cost of Ru makes thinner Ru-based layers desirable.

SUMMARY

This invention relates to a perpendicular magnetic recording medium comprising a substrate and a seed layer comprising a Ni alloy.

Preferred embodiments of this invention is shown and described, simply by way of illustration of the best mode contemplated for carrying out this invention, in the following detailed description. As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

FIG. 2 shows a granular perpendicular magnetic recording medium.

DETAILED DESCRIPTION

One embodiment of the invention is a perpendicular magnetic recording medium comprising a substrate and a seed layer comprising a Ni alloy. In one variation, the Ni alloy has the composition $Ni_{100-x}M_x$, where x has a value such that the Ni alloy has a FCC crystalline structure. Examples of M include, but are not limited to, V, Cr, W, Al, and Ta. In one variation x has a value of between 0 and about 50.

In another embodiment, a thickness of the seed layer is from about 5 to about 200 Å. In another embodiment, the recording medium further comprises one or more interlayers, wherein a total thickness of the interlayer is from about 10 to about 200 Å.

In one variation, the recording medium could further comprise one or more magnetic layers deposited on the one or more interlayers and a carbon overcoat.

Another embodiment is a method of manufacturing a magnetic recording medium comprising depositing depositing a seed layer comprising a Ni alloy.

Figure 1:
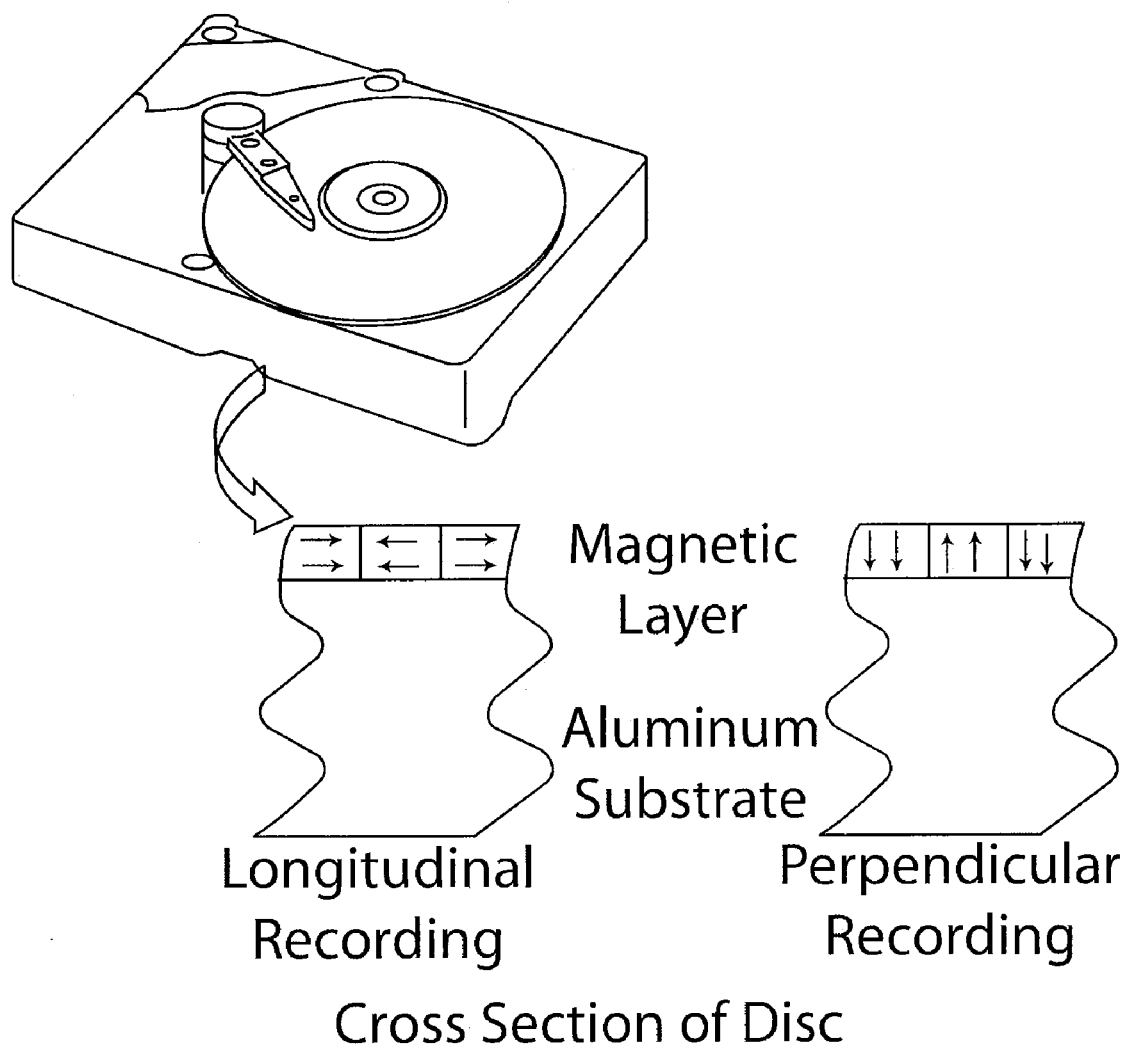
FIG. 1 schematically shows a magnetic disk recording medium comparing longitudinal and perpendicular magnetic recording.
Figure 3:
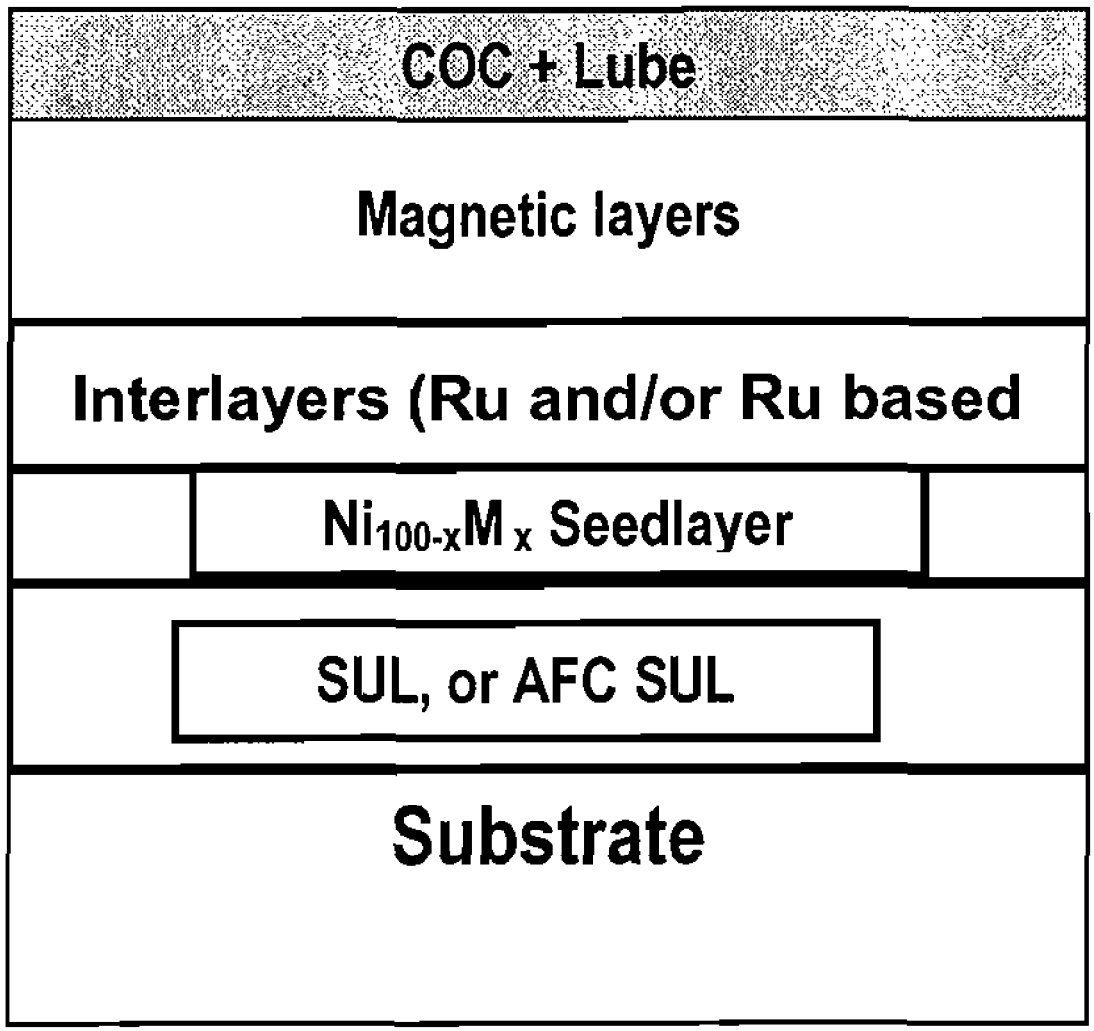
FIG. 3 shows a perpendicular magnetic recording medium according to an embodiment of this invention.

FIG. 3 illustrates one embodiment of the invention showing a perpendicular magnetic recording medium having a substrate, soft underlayer(s), a seed layer comprising a Ni alloy, interlayer(s), and magnetic recording layer(s).

Using a Ni alloy as a seed layer promotes perpendicular crystal growth, which allows the Ru and Ru-based alloy interlayers to have a total thickness of less than 200 Å. In addition, the perpendicular media structure becomes more "rigid" and has higher scratch resistance to hard particles.

Figure 4:
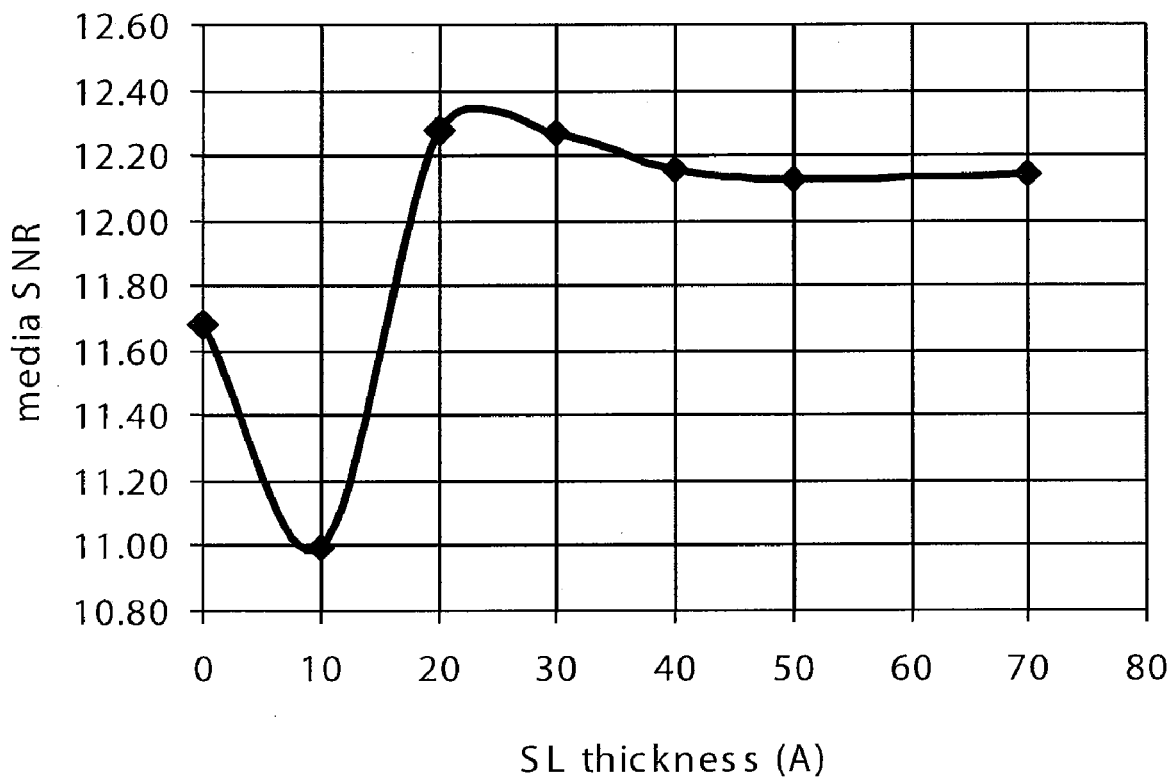
FIG. 4 depicts recording media SNR vs. $Ni_{100-x}M_x$ seed layer thickness.

FIG. 4 shows the general trend of media SNR vs. seed layer thickness, where the seed layer comprises a $Ni_{100-x}M_x$ alloy. When seed layer thickness increases to above 5-20 Å, the media SNR increases to a maximum and stay relatively stable. Eventually, media SNR will drop when the seed layer is too thick.

Figure 5A:
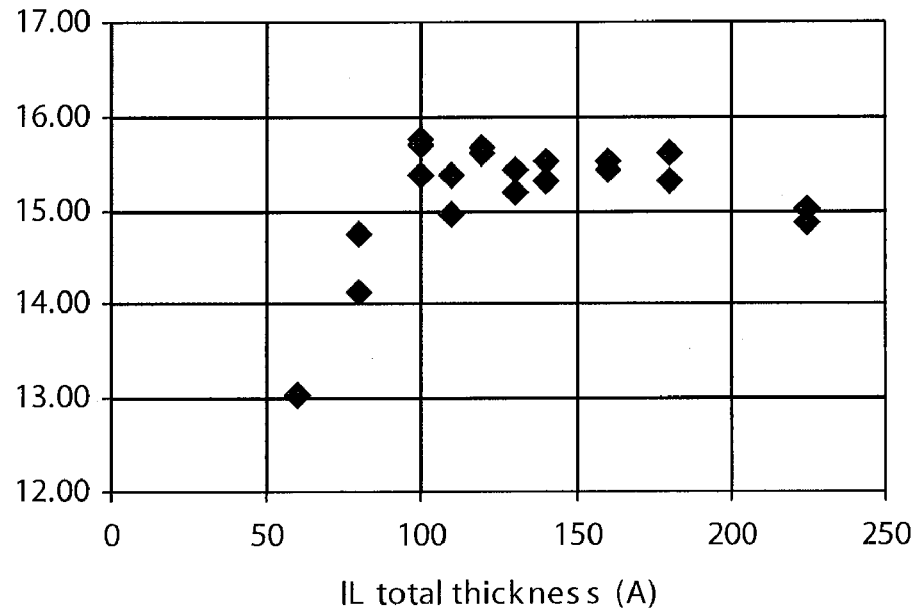
FIG. 5(a) depicts recording media SNR vs. total thickness of Ru-based interlayers.
Figure 5B:
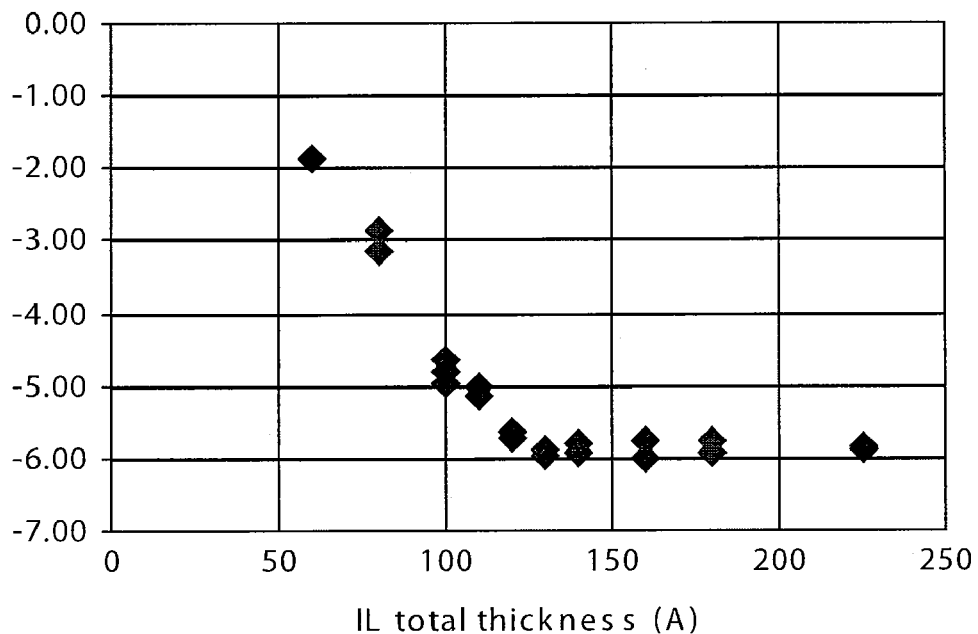
FIG. 5(b) depicts BER vs. total thickness of Ru-based interlayers.

FIGS. 5(a) and 5(b) show the effect of total Ru-based interlayer thickness on (a) media SNR and (b) BER when a $Ni_{100-x}M_x$ seed layer is used. The interlayer thickness is the sum of thickness of low pressure and high pressure Ru and/or Ru-based layers. When using a seed layer according to one embodiment of the invention, good media SNR can be maintained with a total interlayer thickness down to as thin as 100 Å and good BER is maintained with a total interlayer thickness down to about 120 Å.

Figure 6:
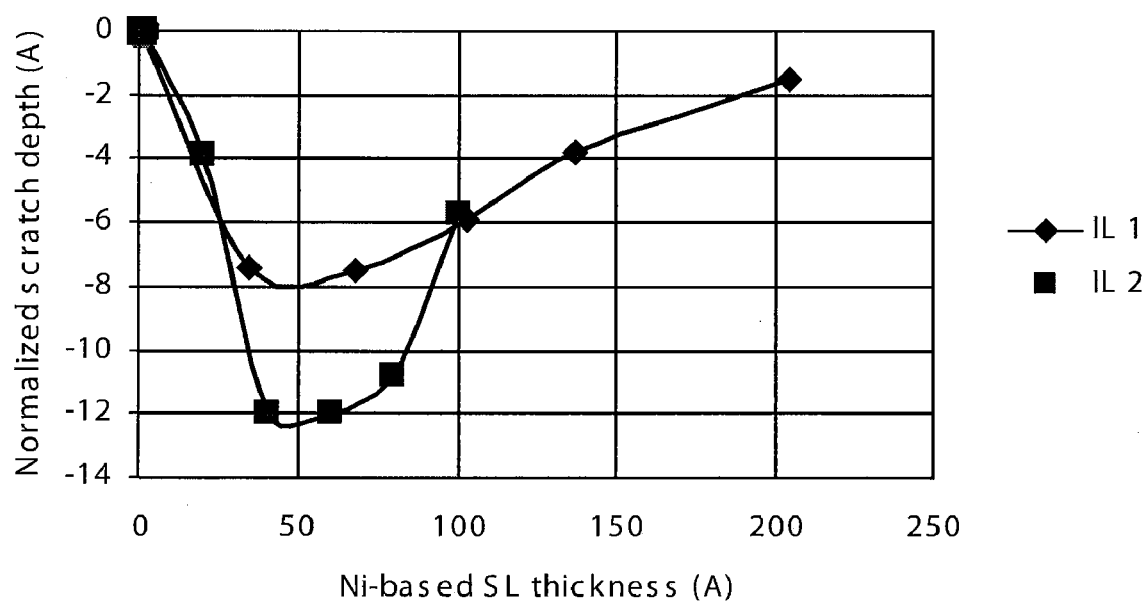
FIG. 6 depicts normalized scratch depth vs. $Ni_{100-x}M_x$ seed layer thickness.

FIG. 6 shows the general trend of media scratch resistance vs. seed layer thickness, where the seed layer comprises a $Ni_{100-x}M_x$ alloy. The scratch depth was measured by atomic force microscopy after a diamond tip scratch on the media surface with a fixed load. The scratch test results were normalized by using the media without any seed layer as a 0 point. As the normalized scratch depth decreases (i.e., becomes more negative) it indicates a more shallow scratch depth. The results depicted in FIG. 6 demonstrate that the scratch depth can be reduced substantially when seed layer thickness is optimized within a certain range. Fortunately, within this range, the media SNR is also excellent (see FIG. 4). As a result, both physical mechanical damage and irreversible magnetic damage are reduced for media having a Ni-based alloy seed layer.

An embodiment of the media comprises, from the bottom to the top:

(1) Substrate: polished glass, glass ceramics, or Al/NiP.
(2) Adhesion layers to ensure strong attachment of the functional layers to the substrates. One can have more than one layer for better adhesion or skip this layer if adhesion is fine. The examples include Ti alloys.
(3) Soft underlayers (SUL) include various design types, including a single SUL, anti-ferromagnetic coupled (AFC) structure, laminated SUL, SUL with pinned layer (also called anti-ferromagnetic exchange biased layer), and so on. The examples of SUL materials include $Fe_xCo_yB_z$ based, and $Co_xZr_yNb_z/Co_zZr_yTa_z$ based series.
(4) Seed layer(s) comprising a Ni alloy having the composition $Ni_{100-x}M_x$, where M is a metal selected from V, Cr, W, Al, and Ta, and x has a value such that the Ni-alloy maintains a FCC crystalline structure. In this embodiment x may have a value of from about 0 to about 50.
(5) Interlayer(s) as a template for Co (00.2) growth. They include Ru-based materials.
(6) Oxide containing magnetic layers (M1) can be sputtered with conventional granular media targets reactively (with $O_x$) and/or non-reactively. Multiple layers can be employed to achieve desired film property and performance. Examples of targets are $Co_{100-x-y}Pt_x(MO)_y$ and/or $Co_{100-x-y-z}Pt_x(X)_y(MO)_z$ series (X is the $3^{rd}$ additives such as Cr, and M is metal elements such as Si, Ti and Nb). Besides oxides in M1, the list can be easily extended such that the magnetic grains in M1 can be isolated from each other with dielectric materials at grain boundary, such as nitrides $(M_xN_y)$, carbon (C) and carbides $(M_xC_y)$. The examples of sputter targets are $Co_{100-x-y}Pt_x(MN)_y$, $Co_{100-x-y}Pt_x(MC)_y$ and/or $Co_{100-x-y-z}Pt_x(X)_y(MN)_z$, $Co_{100-x-y-z}Pt_x(X)_y(MC)_z$ series.

(7) Non-oxide containing magnetic layers (M2): The sputter targets can be used including conventional longitudinal media alloys and/or alloy perpendicular media. Desired performance will be achieved without reactive sputtering. Single layer or multiple layers can be sputtered on the top of oxide containing magnetic layers. The non-oxide magnetic layer(s) will grow epitaxially from oxide granular layer underneath. The orientation could eventually change if these layers are too thick. The examples of these are $Co_{100-x-y-z-\alpha}Cr_xPt_yB_zX_\alpha Y_\beta$.

(8) Cap layer, which is optional for this design. In one variation, with dense grains and grain boundary without oxygen may not be necessary. Conventional carbon and lubrication can be adapted for the embodiment of the claimed media to achieve adequate mechanical performance.

The above layered structure of an embodiment is an exemplary structure. In other embodiments, the layered structure could be different with either less or more layers than those stated above.

Instead of the optional NiP coating on the substrate, the layer on the substrate could be any Ni-containing layer such as a NiNb layer, a Cr/NiNb layer, or any other Ni-containing layer. Optionally, there could be an adhesion layer between the substrate and the Ni-containing layer. The surface of the Ni-containing layer could be optionally oxidized.

The substrates used can be Al alloy, glass, or glass-ceramic. The magnetically soft underlayers according to present invention are amorphous or nanocrystalline and can be FeCoB, FeCoC, FeCoTaZr, FeTaC, FeSi, CoZrNb, CoZrTa, etc. The seed layers and interlayer can be Cu, Ag, Au, Pt, Pd, Ru-alloy, etc. The CoPt-based magnetic recording layer can be CoPt, CoPtCr, CoPtCrTa, CoPtCrB, CoPtCrNb, CoPtTi, CoPtCrTi, CoPtCrSi, CoPtCrAl, CoPtCrZr, CoPtCrHf, CoPtCrW, CoPtCrC, CoPtCrMo, CoPtCrRu, etc., deposited under argon gas, or under a gas mixture of argon and oxygen or nitrogen. Dielectric materials such as oxides, carbides or nitrides can be incorporated into the target materials also.

Embodiments of this invention include the use of any of the various magnetic alloys containing Pt and Co, and other combinations of B, Cr, Co, Pt, Ni, Al, Si, Zr, Hf, W, C, Mo, Ru, Ta, Nb, O and N, in the magnetic recording layer.

In a preferred embodiment the total thickness of SUL could be 100 to 5000 Å, and more preferably 600 to 2000 Å. There could be a more than one soft under layer. The laminations of the SUL can have identical thickness or different thickness. The spacer layers between the laminations of SUL could be Ta, C, etc. with thickness between 1 and 50 Å. The thickness of the seed layer, $t_s$, could be in the range of 5 Å$<t_s<$200 Å. The thickness of an intermediate layer could be 10 to 200 Å, and more preferably about 120 Å. The thickness of the magnetic recording layer is about 50 Å to about 300 Å, more preferably 80 to 150 Å. The adhesion enhancement layer could be Ti, TiCr, Cr etc. with thickness of 10 to 50 Å. The overcoat cap layer could be hydrogenated, nitrogenated, hybrid or other forms of carbon with thickness of 5 to 100 Å, and more preferably 20 to 60 Å.

The magnetic recording medium has a remanent coercivity of about 2000 to about 10,000 Oersted, and an $M_rt$ (product of remanance, Mr, and magnetic recording layer thickness, t) of about 0.2 to about 2.0 memu/cm². In a preferred embodiment, the coercivity is about 2500 to about 9000 Oersted, more preferably in the range of about 4000 to about 8000 Oersted, and most preferably in the range of about 4000 to about 7000 Oersted. In a preferred embodiment, the $M_rt$ is about 0.25 to about 1 memu/cm², more preferably in the range of about 0.4 to about 0.9 memu/cm².

Almost all the manufacturing of a disk media takes place in clean rooms where the amount of dust in the atmosphere is kept very low, and is strictly controlled and monitored. After one or more cleaning processes on a non-magnetic substrate, the substrate has an ultra-clean surface and is ready for the deposition of layers of magnetic media on the substrate. The apparatus for depositing all the layers needed for such media could be a static sputter system or a pass-by system, where all the layers except the lubricant are deposited sequentially inside a suitable vacuum environment.

Each of the layers constituting magnetic recording media of the present invention, except for a carbon overcoat and a lubricant topcoat layer, may be deposited or otherwise formed by any suitable physical vapor deposition technique (PVD), e.g., sputtering, or by a combination of PVD techniques, i.e., sputtering, vacuum evaporation, etc., with sputtering being preferred. The carbon overcoat is typically deposited with sputtering or ion beam deposition. The lubricant layer is typically provided as a topcoat by dipping of the medium into a bath containing a solution of the lubricant compound, followed by removal of excess liquid, as by wiping, or by a vapor lube deposition method in a vacuum environment.

Sputtering is perhaps the most important step in the whole process of creating recording media. There are two types of sputtering: pass-by sputtering and static sputtering. In pass-by sputtering, disks are passed inside a vacuum chamber, where they are deposited with the magnetic and non-magnetic materials that are deposited as one or more layers on the substrate when the disks are moving. Static sputtering uses smaller machines, and each disk is picked up and deposited individually when the disks are not moving. The layers on the disk of the embodiment of this invention were deposited by static sputtering in a sputter machine.

The sputtered layers are deposited in what are called bombs, which are loaded onto the sputtering machine. The bombs are vacuum chambers with targets on either side. The substrate is lifted into the bomb and is deposited with the sputtered material.

A layer of lube is preferably applied to the carbon surface as one of the topcoat layers on the disk.

Sputtering leads to some particulates formation on the post sputter disks. These particulates need to be removed to ensure that they do not lead to the scratching between the head and substrate. Once a layer of lube is applied, the substrates move to the buffing stage, where the substrate is polished while it preferentially spins around a spindle. The disk is wiped and a clean lube is evenly applied on the surface.

Subsequently, in some cases, the disk is prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the disk.

This application discloses several numerical ranges in the text and figures. The numerical ranges disclosed support any range or value within the disclosed numerical ranges even though a precise range limitation is not stated verbatim in the specification because this invention can be practiced throughout the disclosed numerical ranges. In the claims, the terms "a" and "an" mean one or more.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

The implementations described above and other implementations are within the scope of the following claims.

The invention claimed is:

1. An article, comprising:
   a non-magnetic seed layer disposed directly on a soft magnetic underlayer (SUL), the non-magnetic seed layer comprising $Ni_{100-x}M_x$, wherein M is Ta or Al and x has a value such that the non-magnetic seed layer has an fcc crystalline structure; and
   a perpendicular magnetic recording layer over the non-magnetic seed layer.

2. The article of claim 1, wherein x has a value of between 0 and about 50.

3. The article of claim 1, wherein the seed layer further comprises at least one of V, Cr, and W.

4. The article of claim 1, wherein a thickness of the seed layer is from about 60 Å to about 100 Å.

5. The article of claim 1, wherein the SUL comprises one or more soft magnetic underlayers.

6. The article of claim 1, further comprising one or more interlayers between the non-magnetic seed layer and perpendicular magnetic recording layer, wherein a total thickness of the one or more interlayers is greater than about 100 Å and less than about 150 Å.

7. A method comprising:
   depositing a non-magnetic seed layer directly on a soft magnetic underlayer (SUL), the non-magnetic seed layer comprising $Ni_{100-x}M_x$, wherein M is Ta or Al and x has a value such that the non-magnetic seed layer has an fcc crystalline structure;
   depositing a perpendicular magnetic recording layer over the non-magnetic seed layer.

8. The method of claim 7, wherein x has a value of between 0 and about 50.

9. The method of claim 7, wherein the seed layer further comprises at least one of V, Cr, and W.

10. The method of claim 7, wherein a thickness of the seed layer is from about 60 Å to about 100 Å.

11. The method of claim 7, further comprising depositing one or more interlayers over the non-magnetic seed layer, wherein a total thickness of the one or more interlayers is from about 10 to about 200 Å.

12. The method of claim 7, further comprising depositing one or more interlayers between the non-magnetic seed layer and perpendicular magnetic recording layer, wherein a total thickness of the one or more interlayers is greater than about 100 Å and less than about 150 Å.

13. The method of claim 12, wherein at least one of the interlayers has a hcp crystalline structure.

14. The method of claim 13, wherein the seed layer has a thickness of between about 15 angstroms and about 40 angstroms.

15. The method of claim 7, further comprising:
depositing an interlayer; and
depositing the soft macmetic underlayer between the non-magnetic seed layer and a substrate.

16. The method of claim 15, wherein the interlayer has a thickness of between about 100 angstroms and about 150 angstroms, and the seed layer has a thickness of between about 15 angstroms and about 40 angstroms.

17. A magnetic recording medium comprising:
a substrate;
a soft magnetic underlayer over the substrate;
a non-magnetic seed layer disposed directly on the soft magnetic underlayer, the non-magnetic seed layer comprising $Ni_{100-x}M_x$, wherein M is Ta or Al and x has a value of between 0 and about 50 such that the non-magnetic seed layer has an fcc crystalline structure;
an interlayer over the non-magnetic seed layer, the interlayer having a hcp crystalline structure; and
a perpendicular magnetic recording layer over the interlayer.

18. The medium of claim 17, wherein of the interlayer has a thickness greater than about 100 Å and less than about 150 Å.

* * * * *

UNITED STATES PATENT AND TRADEMARK OFFICE
CERTIFICATE OF CORRECTION

| | | |
|---|---|---|
| PATENT NO. | : 8,053,096 B2 | Page 1 of 1 |
| APPLICATION NO. | : 12/178375 | |
| DATED | : November 8, 2011 | |
| INVENTOR(S) | : Hazanov et al. | |

It is certified that error appears in the above-identified patent and that said Letters Patent is hereby corrected as shown below:

In the Claims

Column 7, Claim 15, line 6: "macmetic underlayer" should be --magnetic underlayer--

Signed and Sealed this
Third Day of January, 2012

David J. Kappos
*Director of the United States Patent and Trademark Office*